(No Model.)

F. H. BOLTE.
BICYCLE.

No. 447,933. Patented Mar. 10, 1891.

Witnesses
Geo W Young
N. E. Oliphant

Inventors
Frank H. Bolte
By H. G. Underwood
Attorneys

UNITED STATES PATENT OFFICE.

FRANK H. BOLTE, OF MILWAUKEE, WISCONSIN, ASSIGNOR OF ONE-HALF TO PARKER H. SERCOMBE, OF SAME PLACE.

BICYCLE.

SPECIFICATION forming part of Letters Patent No. 447,933, dated March 10, 1891.

Application filed September 29, 1890. Serial No. 366,465. (No model.)

*To all whom it may concern:*

Be it known that I, FRANK H. BOLTE, a citizen of the United States, and a resident of Milwaukee, in the county of Milwaukee, and in the State of Wisconsin, have invented certain new and useful Improvements in Bicycles and Analogous Vehicles; and I do hereby declare that the following is a full, clear, and exact description thereof.

My invention consists in certain peculiarities of construction and combination of parts to be hereinafter described with reference to the accompanying drawings, and subsequently claimed.

Figure 1:
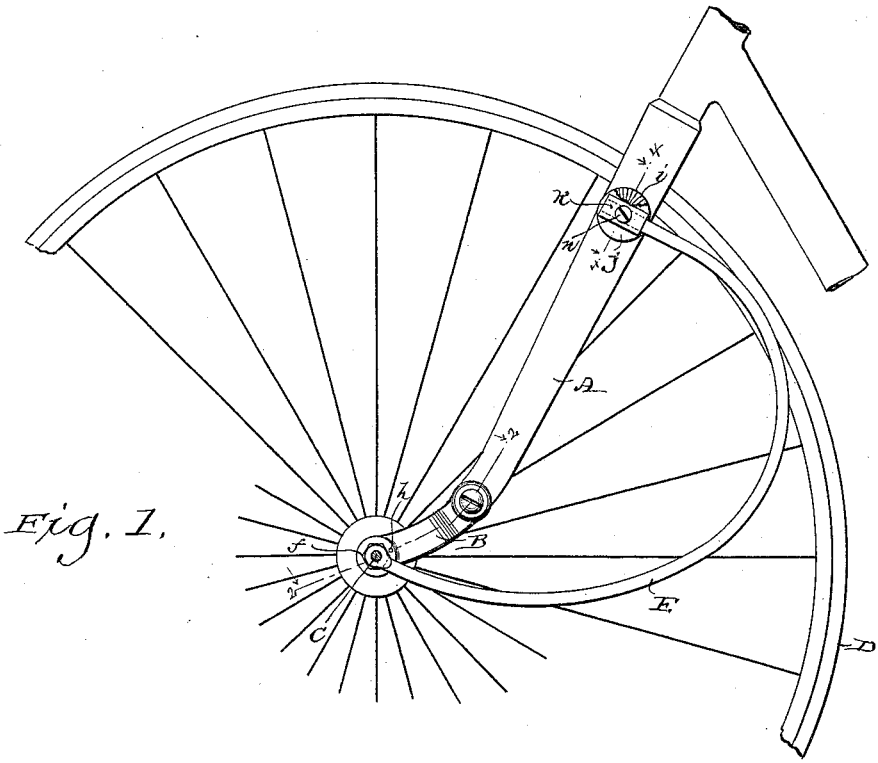
Figure 2:
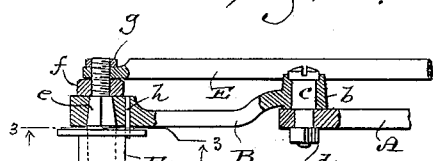
Figure 3:
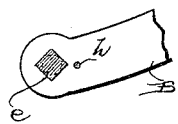
Figure 4:
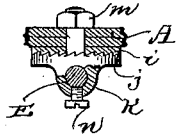

In the drawings, Figure 1 represents a side elevation of a portion of a bicycle provided with my improvements; Fig. 2, a plan view, partly in horizontal section on line 2 2 of Fig. 1; Fig. 3, a detail side elevation, partly in section on line 3 3 of Fig. 2; and Fig. 4, a detail front elevation, partly in section on line 4 4 of Fig. 1.

Referring by letter to the drawings, A represents the branches of the front fork of a bicycle; B, links pivotally connected to the fork branches; C, an axle rigid in the links; D, a wheel arranged on the axle, and E curved spring-rods connecting said fork branches and axle. The inner or pivot end of each link is preferably in the form of a shouldered sleeve $b$, that loosely engages a shouldered bolt $c$, the reduced inner end of the latter being passed through the adjacent fork branch, and by means of a nut $d$ on this reduced end of the bolt the parts may be tightened from time to time to take up wear. The outer end of each link is preferably provided with a squared opening to engage a squared portion $e$ of the axle C, and I also prefer to taper said opening and squared portions of the axle, in order that the same may be wedged one upon the other in order to obtain an extremely tight fit.

The ends of the axle C are preferably screw-threaded, and nuts $f$ thereon are run up against the adjacent links B, the lower extremities of the spring E being slipped onto said ends of the axle and preferably held in place by means of nuts $g$, this construction being best illustrated in Fig. 2.

Screw-threaded on the axle C adjacent to the links B are cones F, and pins $h$ are passed through said links to engage the cones and hold the latter in their adjusted position.

As shown, each fork branch A is provided on its outer side with a radially-serrated and rigid disk $i$ for engagement with a similar disk $j$, the latter having an eye $k$ on its outer side and an inwardly-extended screw-threaded shank passed through the former disk and said fork branch to engage a nut $m$, whereby the several parts are clamped together, the opposing serrations in said disks being of such shape that the greatest possible resistance is offered to the strain to prevent slipping. The upper extremity of each spring E engages one of the eyes $k$ and is adjustably secured therein by a set-screw $n$, and by having the disks $i$ $j$ constructed as above described the tension of said spring may be varied by the adjustment of the latter disk upon the former.

By the construction and arrangement of parts herein specified the wheel D will yield to inequalities in its path and move on a circle struck from the pivot connections at the juncture of the fork branches A and links B, this being due to the fact that the axle C is rigid in said links. The yield of the wheel is met by the resistance of the springs E, connecting the axle and fork branches, and thus unpleasant jarring of the rider is avoided, while at the same time said wheel is held against lateral movement, the latter result being also due to the rigid connection of the spring-controlled axle and links.

Having thus described my invention, what I claim as new, and desire to secure by Letters Patent, is—

1. In a bicycle or analogous vehicle, a fork, links pivotally connected to the same and provided with tapered polygonal openings, an axle having tapered polygonal portions engaging the openings in the links, a wheel on the axle, and a spring-resistance arranged to oppose pivotal movement of said links, substantially as set forth.

2. In a bicycle or analogous vehicle, a fork, links pivotally connected thereto, an axle rigid in the links, a wheel on the axle, radially-serrated disks fast on the fork branches, similar disks engaging the first and provided with screw-threaded shanks extended through said fork branches, clamping-nuts arranged on said shanks, and bow-springs having their upper extremities fast to the shanked disks and arranged to resist pivotal movement of said links, substantially as set forth.

3. In a bicycle or analogous vehicle, a fork, links pivotally connected thereto, an axle rigid in the links, a wheel and cones arranged on the axle, pins connecting the links and cones, and a spring-resistance arranged to oppose pivotal movement of said links, substantially as set forth.

4. In a bicycle or analogous vehicle, a fork, links pivotally connected thereto, an axle rigid in the links, a wheel on the axle, serrated disks fast on the fork branches, similar disks engaging the first, curved spring-rods having their lower extremities arranged to resist pivotal movement of said links, and suitable means for clamping the upper extremities of said springs, outer disks, and fork branches, substantially as set forth.

5. In a bicycle or analogous vehicle, a fork, spring-controlled hangers having their inner ends in the form of shouldered sleeves, shouldered pivots connecting the fork and sleeve ends of the hangers, an axle supported by the hangers, and a wheel on the axle, substantially as set forth.

6. In a bicycle or analogous vehicle, a fork, spring-controlled hangers having their inner ends in the form of shouldered sleeves, shouldered pivot-bolts connecting the fork and sleeve ends of the hangers, nuts adjustable on the bolts, an axle supported by the hangers, and a wheel on the axle, substantially as set forth.

7. In a bicycle or analogous vehicle, a fork, spring-controlled links pivotally connected to the same and provided with squared openings, an axle having squared portions fitting the link-openings and extended portions beyond the links, retaining devices carried by the axle in opposition to said links, and a wheel on said axle, substantially as set forth.

In testimony that I claim the foregoing I have hereunto set my hand at Milwaukee, in the county of Milwaukee and State of Wisconsin, in the presence of two witnesses.

FRANK H. BOLTE.

Witnesses:
N. E. OLIPHANT,
WM. KLUG.